(12) United States Patent
Keralapura et al.

(10) Patent No.: US 9,992,209 B1
(45) Date of Patent: Jun. 5, 2018

(54) SYSTEM AND METHOD FOR CHARACTERIZING SECURITY ENTITIES IN A COMPUTING ENVIRONMENT

(71) Applicant: Awake Networks, Inc., Mountain View, CA (US)

(72) Inventors: Ram Keralapura, San Jose, CA (US); Gary Golomb, Los Gatos, CA (US)

(73) Assignee: AWAKE SECURITY, INC., Mountain View, CA (US)

( * ) Notice: Subject to any disclaimer, the term of this patent is extended or adjusted under 35 U.S.C. 154(b) by 218 days.

(21) Appl. No.: 15/136,870

(22) Filed: Apr. 22, 2016

(51) Int. Cl.
*H04L 29/06* (2006.01)
*G06F 17/30* (2006.01)

(52) U.S. Cl.
CPC .... *H04L 63/1408* (2013.01); *G06F 17/30616* (2013.01); *G06F 17/30707* (2013.01)

(58) Field of Classification Search
CPC .................................................. H04L 63/1408
See application file for complete search history.

(56) References Cited

U.S. PATENT DOCUMENTS

| | | | | |
|---|---|---|---|---|
| 7,313,523 B1* | 12/2007 | Bellegarda | ............ | G10L 13/033 704/257 |
| 8,463,036 B1* | 6/2013 | Ramesh | ............... | G06K 9/4642 382/170 |
| 8,549,016 B2* | 10/2013 | Stefik | ....................... | G06F 17/30 707/749 |
| 8,990,199 B1* | 3/2015 | Ramesh | ............ | G06F 17/30256 707/736 |
| 9,449,182 B1* | 9/2016 | Dang | ................ | G06F 17/30011 |
| 9,479,405 B1* | 10/2016 | Tongaonkar | ............ | H04L 43/04 |
| 9,818,406 B1* | 11/2017 | Chan | ....................... | G10L 15/22 |
| 2003/0101187 A1* | 5/2003 | Gaussier | ............. | G06F 17/3071 |
| 2005/0004949 A1* | 1/2005 | Trepess | ............. | G06F 17/30696 |
| 2011/0179114 A1* | 7/2011 | Dilip | .................. | G06F 17/30867 709/204 |
| 2012/0066073 A1* | 3/2012 | Dilip | .................. | G06Q 30/0269 705/14.66 |
| 2012/0259831 A1* | 10/2012 | Wang | ................ | G06F 17/30867 707/708 |
| 2015/0317390 A1* | 11/2015 | Mills | ................. | G06F 17/30663 707/777 |

* cited by examiner

*Primary Examiner* — Ali Shayanfar
(74) *Attorney, Agent, or Firm* — Minisandram Law Firm; Raghunath S. Minisandram

(57) ABSTRACT

System and method to characterize a security entity in a computing environment is disclosed. Communication between a user computer and at least one destination computer by a security appliance is monitored by a security appliance. Selective information from the communication is extracted by the security appliance, selective information indicative of the security entity. A plurality of words from the communication between the identified security entity and at least one destination computer are selectively extracted. A word cloud is generated based on the selectively extracted plurality of words. The word cloud is evaluated to characterize the identified security entity.

14 Claims, 20 Drawing Sheets

| Decisive Identifiers | Security Entity |
|---|---|
| Kerberos ID | User |
| pac Email | User |
| Personal Email | User |
| userid | User |
| ApplePushGUID | Device |
| Kerberos Device | Device |
| Cookies | Device + Browser |

FIGURE 4

| Attributes |
|---|
| event_ssl |
| os |
| os_version |
| browser |
| compile_version |

FIGURE 4A

| Decisive Identifiers | Protocol | Required Fields |
|---|---|---|
| Kerberos ID | kerberos | client, success |
| pac Email | http | uri |
| Personal Email | http | uri |
| userid | http | uri |
| ApplePushGUID | ssl | client_subject |
| Kerberos Device | kerberos | client |
| Cookies | http | uri |

FIGURE 4B

| Time Stamp | Source ID | Client | Status |
|---|---|---|---|
| 1428494181 | 1.1.1.1 | ABC-11111$/GEO.DOMAIN.COM | Success |
| 1428494181 | 1.1.1.1 | john.doe/GEO.DOMAIN.COM | Success |
| 1428494332 | 1.1.1.1 | ABC-11111$/GEO.DOMAIN.COM | Success |
| 1428497128 | 1.1.1.1 | ABC-22222$/GEO.DOMAIN.COM | Success |
| 1428497128 | 1.1.1.1 | jane.smith/GEO.DOMAIN.COM | Success |

| Time Stamp | Source ID | Decisive Identifier | Comments |
|---|---|---|---|
| 1428494181.223 | 1.1.1.1 | Kerberos: A | Associate *Kerberos:A* to ID 1.1.1.1 in the interval [1428494181-1428494182] |
| 1428494183.188 | 1.1.1.1 | - | http session |
| 1428494184.889 | 1.1.1.1 | - | sip session |
| 1428494198.226 | 1.1.1.1 | Personal Email: M | Associate *Personal Email: M* to ID 1.1.1.1 in the interval [1428494198-1428494199] |
| 1428494261.781 | 1.1.1.1 | Kerberos: A | Associate *Kerberos:A* to ID 1.1.1.1 in the interval [1428494262-1428494263] Extend *Kerberos:A* to ID 1.1.1.1 in the interval [1428494182-1428494263] |
| 1428494322.689 | 1.1.1.1 | - | ftp session |
| 1428494543.299 | 1.1.1.1 | Personal Email: M | Associate *Personal Email:M* to ID 1.1.1.1 in the interval [1428494543-1428494544] Extend *Personal Email:M* to ID 1.1.1.1 in the interval [1428494199-1428494544] |
| 1428494666.121 | 1.1.1.1 | - | http session |

| Time Stamp 602 | Source ID 604 | Decisive Identifier 606 | Comments 608 |
|---|---|---|---|
| 1428494798.222 | 1.1.1.1 | - | sip session |
| 1428494798.223 - 1428496871.900 | 1.1.1.1 | - | No activity |
| 1428496871.901 | 1.1.1.1 | Kerberos: A | Associate *Kerberos:A* to ID 1.1.1.1 in the interval [1428496871-1428496872] — 630<br>*Extend Kerberos:A* to ID 1.1.1.1 in the interval [1428494263-1428494799] |
| 1428496922.561 | 1.1.1.1 | - | http session |
| 1428496972.222 | 1.1.1.1 | - | sip session |
| 1428496972.223 - 1428497128.571 | 1.1.1.1 | - | No activity |
| 1428497128.572 | 1.1.1.1 | Kerberos: B | Associate *Kerberos:B* to ID 1.1.1.1 in the interval [1428497128-1428497129] — 634<br>*Extend Kerberos:A* to ID 1.1.1.1 in the interval [1428496872-1428496973] |

FIGURE 6B

| Time Stamp | Source ID | First Security Entity | Second Security Entity | First Decisive Identifier | Second Decisive Identifier |
|---|---|---|---|---|---|
| T1 | 1.1.1.1 | First User Computer | First User | Kerberos:A | |
| T2 | 1.1.1.1 | First User Computer | First User | | Personal Email: M |
| T3 | 1.1.1.1 | First User Computer | First User | Kerberos:A | |
| T4 | 1.1.1.1 | First User Computer | First User | | Personal Email:M |
| T5 | 1.1.1.1 | No activity | | | |
| T6 | 1.1.1.1 | First User Computer | First User | Kerberos:A | |
| T7 | 1.1.1.1 | No Activity | | | |
| T8 | 1.1.1.1 | Second User Computer | Second User | Kerberos:B | |

FIGURE 7A

| Time stamp | Source ID | First Security Entity | Second Security Entity | First Decisive Identifier | Second Decisive Identifier |
|---|---|---|---|---|---|
| T1-T5 | 1.1.1.1 | First User Computer | First User | Kerberos:A | |
| T2-T4 | 1.1.1.1 | First User Computer | First User | | Personal Email: M |
| T5-T6 | 1.1.1.1 | No activity | | | |
| T6-T7 | 1.1.1.1 | First User Computer | First User | Kerberos:A | |
| T7-T8 | 1.1.1.1 | No activity | | | |
| T8-T9 | 1.1.1.1 | Second User Computer | Second User | Kerberos:B | |

FIGURE 7B

| WORD | WEIGHTED WORD SCORE | FONT SIZE |
|---|---|---|
| h1b | 3000 | 50 pt |
| visa | 2000 | 40 pt |
| ead | 1500 | 30 pt |

FIGURE 8B 806-3

Topic Cluster 1: company,access,business,website,use,information,web,security,blocked,related,warning,soft,accept, http,video,file,please,team,site,content Topic Cluster 2: company,access,website,business,use,information,web,blocked,related,security,warning,accept,soft, file,http,please,team,video,content,required                            902-2

...

Topic Cluster 33: h1b,visa,ead,reply,year,feb,uscis,employer,approved,petition,application,status,rfe,may,lottery, company,case,apply,h -4,work Topic Cluster 38: lawyer,trailer,use,shell,avvo,houston,business,law,access,website,view,texas,real,information, estate,weaver,review,scripting,attorney,year Topic Cluster 42 gas,flow,flare,steam,meter,pressure,mass,system,may,rate,measurement,figure,control,energy, proceeding,valve,technology,houston,industrial,conference Topic Cluster 43: arctic,shell,e&e,oil,decision,environmental,march,interior,u.s,climate,gas,step,energy,way, summer,policy,plan,said,lease,drilling                                              902-4

Topic Cluster 44: wedding,program,favor,gift,ceremony,cake,personalized,topper,set,card,candle,format,advice, accessory,decoration,deceased,sign,planning,bridal,top Topic Cluster 45: houston,shell,charity,open,club,policy,golf,tournament,update,course,video,file,april,exit, directory,found,east,parking,coverage,insider Topic Cluster 47: god,ramirez,shell,people,access,daniel,use,website,island,life,know,business,jesus,search,word, information,record,way,one,want Topic Cluster 49: service,plan,care,coverage,visit,covered,cost,health,see,pay,benefit,example,provider, 1 800-CIGNA24 carved,charge,glossary,co- pay,call,use

FIGURE 9A

| SECUTITY ENTITY | RECURRING TOPIC CLUSTER | TRANSIENT TOPIC CLUSTER |
|---|---|---|
| FIRST USER | TOPIC CLUSTER 1<br>TOPIC CLUSTER 2<br>TOPIC CLUSTER 33<br>TOPIC CLUSTER 38 | TOPIC CLUSTER 44<br>TOPIC CLUSTER 45 |

FIGURE 9B

SYSTEM AND METHOD FOR CHARACTERIZING SECURITY ENTITIES IN A COMPUTING ENVIRONMENT

TECHNICAL FIELD

The present invention relates generally to characterizing security entities in a computing environment and, more particularly, characterizing security entities based on network communication in the computing environment.

DESCRIPTION OF RELATED ART

In the present day computing environment, an enterprise has to deal with monitoring and tracking enormous amount of activities occurring between various computing devices. Computing environment may include various security entities. A security entity may be a person, an application or a computing device whose behavior needs to be understood by a network administrator to maintain integrity of the network environment. In some examples, identifying a security entity and characterizing a security entity based on network communication may be required to understand and maintain integrity of the network environment.

In order to conduct a focused analysis of one or more security entities, there is a need to identify a security entity and characterize the security entity. As the number of security entities and number of transactions over a computing environment increases, selectively identifying one or more security entities and characterizing them becomes challenging. In some examples, characterizing a security entity may be advantageous in maintaining integrity of the network environment. It is with these needs in mind, this disclosure arises.

SUMMARY OF THE INVENTION

In one embodiment, a method for characterizing a security entity in a computing environment is disclosed. Communication between a user computer and at least one destination computer is monitored by a security appliance. Selective information from the communication is extracted by the security appliance, selective information indicative of the security entity. A plurality of words from the communication between the identified security entity and at least one destination computer are selectively extracted. A word cloud is generated based on the selectively extracted plurality of words. The word cloud is evaluated to characterize the identified security entity.

In yet another embodiment, a system to characterize a security entity in a computing environment is disclosed. Communication between a user computer and at least one destination computer is monitored by a security appliance. Selective information from the communication is extracted by the security appliance, selective information indicative of the security entity. A plurality of words from the communication between the identified security entity and at least one destination computer are selectively extracted. A word cloud is generated based on the selectively extracted plurality of words. The word cloud is evaluated to characterize the identified security entity.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures:

FIG. 4 shows an example table with a plurality of decisive identifiers and corresponding security entities the decisive identifiers identify;

FIG. 4A shows an example table with a plurality of attributes associated with one or more security entities;

FIG. 4B shows an example table with various decisive identifiers, corresponding protocol of the network packet and one or more fields of the network packet required to identify the corresponding decisive identifier;

FIG. 5 shows a table with various time stamps with decisive identifiers associated with source identifiers;

FIGS. 6A and 6B show table with various time stamp and corresponding decisive identifiers;

FIG. 7A shows an example knowledge graph according to an example implementation of this disclosure;

FIG. 7B shows an enhanced knowledge graph, according to an example implementation of this disclosure;

FIG. 8B shows an example table with words with their corresponding weighted word score for some words in the word cloud of FIG. 8A, according to an example implementation of this disclosure;

FIG. 9A is another example topic cluster, according to an example implementation of this disclosure;

FIG. 9B is an example table, showing recurring topic clusters and transient topic cluster, according to an example implementation of this disclosure;

DETAILED DESCRIPTION

Figure 1:
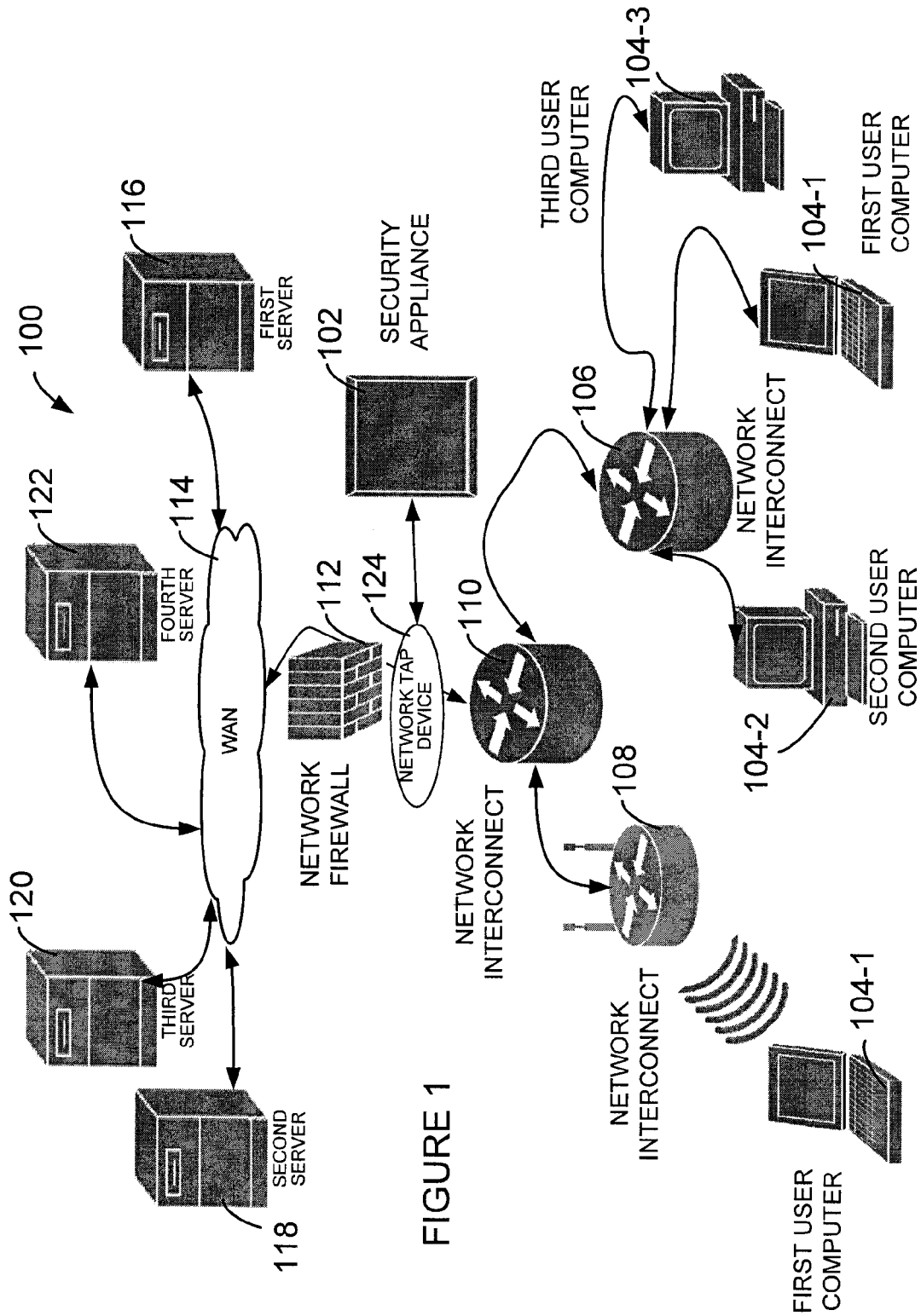
FIG. 1 shows an example computing environment with example security appliance of this disclosure, according an example of this disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a systems and methods for evaluating security entities in a computing environment. Referring now to the drawings, where similar reference characters denote corresponding features consistently throughout the figures, various examples of this disclosure is described.

FIG. 1 depicts an example computing environment 100, with a security appliance 102 of this disclosure. The computing environment 100 includes a plurality of user computers, for example, a first user computer 104-1, a second user computer 104-2 and a third user computer 104-3. The computing environment also includes a plurality of network interconnect devices 106, 108 and 110. In some examples, network interconnect device 106 may couple first user computer 104-1, second user computer 104-2 and third user computer 104-3 to form a local area network, for example, an office network. The network interconnect device 108 may be a wireless router, for example, in a conference room, that may couple one or more user computers to form another network, for example, conference room wireless network. For example, the first user computer 104-1 may also selectively couple to the network interconnect device 108, when the first user computer 104-1 is in the conference room.

The network interconnect device 110 may be configured to couple to a network firewall device 112, which may couple the network interconnect device 110 to a wide area network 114. The network interconnect device 106 and 108 may couple to network interconnect device 110 to access the wide area network 114. A plurality of servers, for example, a first server 116, a second server 118, a third server 120 and a fourth server 122 may be coupled to the wide area network 114. The plurality of servers may be accessible to the first user computer 104-1, second user computer 104-2 and the third user computer 104-3 through the network interconnect device 110.

In one example, a network tap device 124 may be disposed between the network interconnect device 110 and the firewall device 112. The network tap device 124 may be configured to intercept and forward any communication between a user computer and a server, over the wide area network 110 to the security appliance 102. Various functions and features of the security appliance 102 will now be described with reference to FIG. 2.

Figure 2:
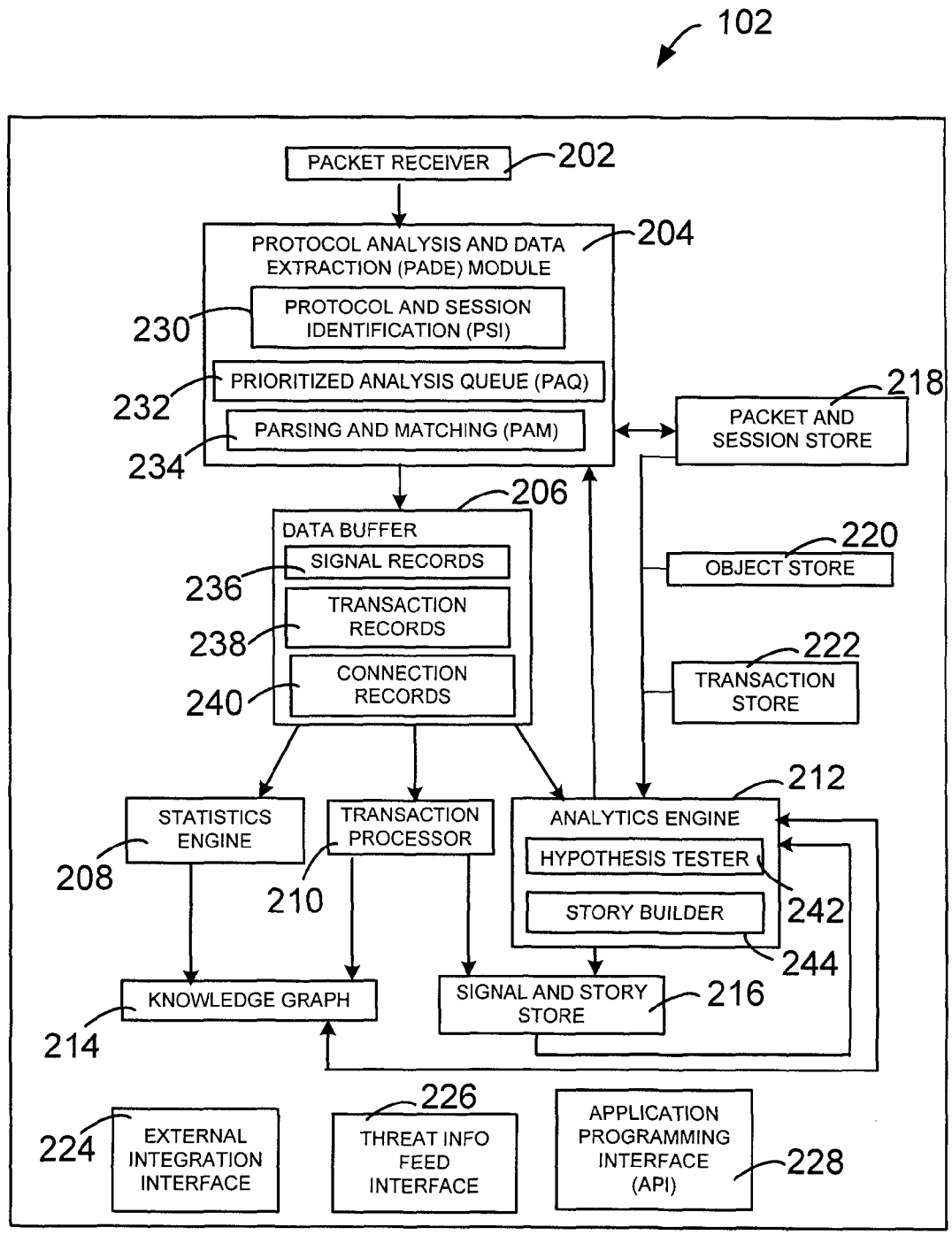
FIG. 2 depicts block diagram of an example security appliance of this disclosure.

Now, referring to FIG. 2, example security appliance 102 of this disclosure will be described. The security appliance 102 includes a packet receiver 202, a protocol analysis and data extraction module 204 (sometimes referred to as PADE module 204), a data buffer 206, a statistics engine 208, a transaction processor 210, an analytics engine 212, a knowledge graph 214, a signal and story store 216, a packet and session store 218, an object store 220 and a transaction store 222. The security appliance may additionally have an external integration interface 224, a threat info feed interface 226 and an application programming interface (API) 228. Various function and features of the security appliance 102 will now be described. Detailed operation of the security appliance 102 will be later described with reference to additional examples and figures.

The packet receiver 202 is configured to receive information from the network tap device 124. For example, packet receiver 202 may receive information related to network communication between a user computer and one or more servers, from the network tap device 124 in real time. Information related to network information may be one or more packets of information transmitted and received by the user computer. In some examples, the packet receiver 202 may be configured to receive information related to network communication between a user computer and one or more servers that might have been captured by a capture device (not shown) and stored in a data store (not shown). The information related to network communication between a user computer and one or more servers may sometimes be referred to as packets or packet of information in this disclosure. As one skilled in the art appreciates, the packet of information may contain information encapsulated in multiple layers. Analysis and extraction of information from each layer may lead to information in subsequent layers.

The PADE module 204 includes a protocol and session identification module 230 (sometimes referred to as PSI module 230), prioritized analysis queue 232 (sometimes referred to as PAQ module 232) and parsing and matching module 234 (sometimes referred to as PAM module 234). The PADE module 204 is configured to receive packet of information. The PADE module 204 queues the received packet to be stored in the packet and session store 218. Further, the PADE module 204 queues the received packet with an initial priority for further analysis by the PAQ module 232. The PAM module 234 analyzes the received packet by parsing protocol information from the packet content for each protocol encapsulated in the packet, and matches that data with feature patterns of interest, for example, security or network visibility. Processing of the packets by the PADE module 204 is an iterative process, where one level of encapsulation is processed to determine and discover information in that protocol and the protocol of the next encapsulation.

In one example, the prioritization used for analysis of the packet is based on a probability that the packet may be associated with a threat. This prioritization may be periodically updated, as the analysis of the packet proceeds. In some situations, there may be insufficient resources available at the packet and session store 218 to store all packets that are queued for storage. In one example, the selection of packet information to write (or store) to the packet and session store 218 may be based on a value of threat probability. In some examples, the selection of packet information to store may be based on a value of threat probability at the time selection is made, rather than when the packet was queued for storage. In other words, the queue to store the packet information is prioritized based on a value of threat probability.

Once a packet has been selected for storage, raw data of the packet may be written into the packet and session store 218 in a compressed form. The packet and session store 218 may also have indexing data for the packets to facilitate retrieval of the packets based on one or more attributes. For example, the attributes for indexing may be one or more of packet timestamp, network addresses, protocol and the like. Connection information extracted and generated by the PADE module 204 from one or more packets may contain references to corresponding sessions in the packet and session store 218. In one example, connection information may be stored in the knowledge graph 214, after further processing. Connection information may correspond to a plurality of attributes like user computer, details about user of the user computer, host server, organization of the user of the user computer and the like.

The PADE module 204 based on the analysis of the packets, identifies signal records, which may sometimes be referred to as weak signals indicative of a threat, transaction records and connection records. The identified signal records 236, transaction records 238 and the connection records 240 are stored in the data buffer 206 for further processing.

The statistics engine 208 processes the connection records 240 stored in the data buffer 206 and profiles the connection information from the connection records. Connection information may be stored in the knowledge graph 214, after further processing by the statistics engine 208. Connection information may correspond to a plurality of attributes like user computer, details about user of the user computer, host server, organization of the user of the user computer and the like.

The transaction processor 210 processes the transaction records 238 and extracts transaction information from the transaction records. Extracted transaction information by the transaction processor 210 is stored in the knowledge graph 214. Selective extracted transaction information is also stored in the signal and story store 216.

The analytics engine 212 processes the signal records 236. As previously indicated, signal records 236 may indicate weak signals of an impending threat. The analytics engine 212 analyzes the signal records 236 and develops a possible story of a likely threat. The story may be a sequence of signals about user computer, activity being performed and the like. The hypothesis tester 242 evaluates one or more weak signals for a likely threat. For example, one or more threshold values may be used to evaluate a likely threat. The story builder 244 builds a possible scenario for a likely threat, based on analyzed signal records. Selective generated story and corresponding signal records may be stored in the signal and story store 216.

As one skilled in the art appreciates, the information previously stored in the signal and story store 216 may be used by the analytics engine 212 during evaluation of subsequent signal records to further update or modify a possible scenario for a likely threat. Additionally, the analytics engine 212 may use information stored in the knowledge graph 214 during evaluation of signal records and building of a story for a likely threat. The story builder 244 also uses the analyzed signal records to generate information to update priority of analysis of incoming packets by the PADE module 204.

As one skilled in the art appreciates, the data buffer 206 may store information related to signal records 236, transaction records 238 and connection records 240 on a temporary basis. One or more additional data stores may be provided to store these information for an extended period of time, for possible future use. Object store 220 is a data store to store information related to various objects. For example, in some examples, objects may be files exchanged between a user computer and destination computer. Transaction store 222 stores information related to transaction, for example, for an extended period of time.

External integration interface 224 may provide an interface to communicate with other appliances, for example, other security appliances. Threat info feed interface 226 may provide an interface to communicate with external threat information feeds. These external threat information feed may be used by the security appliance 102 during various stages on analysis and story building. Application programming interface 228 may provide interface to one or more applications. For example, application programming interface 228 may provide an interface to an user interface application to permit a user to interact with the security appliance 102.

Figure 3:
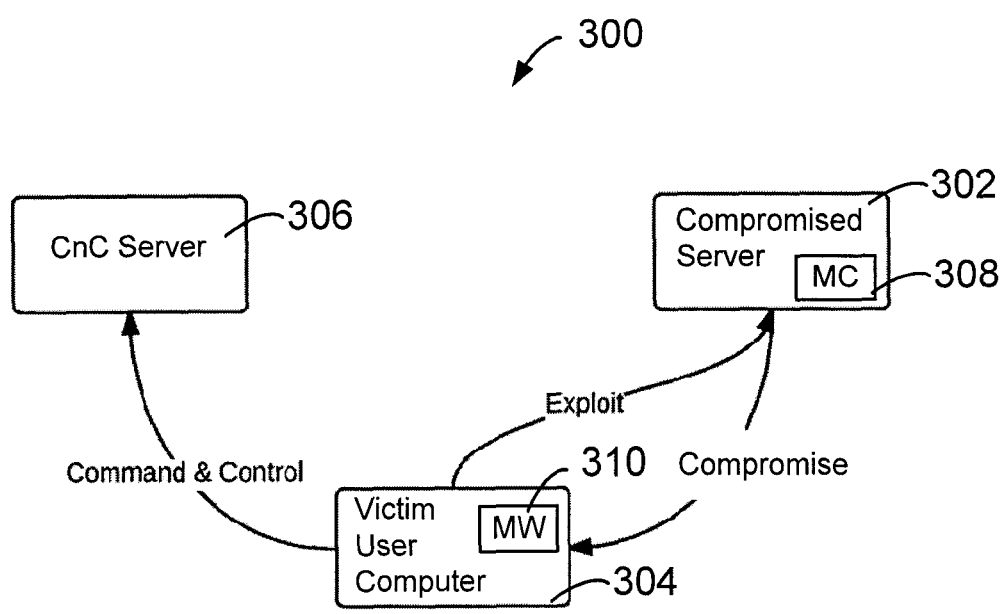
FIG. 3 shows various phases of an example malicious attack in an example computing environment.

Having described an example security appliance 102 of this disclosure, now referring to FIG. 3, flow diagram 300 shows various phases of an example malicious attack. FIG. 3 shows a compromised server 302, a victim user computer 304 and a command and control server 306 (sometimes referred to as a CnC server 306). In some examples, the victim user computer 304 may correspond to one of the first user computer 104-1, second user computer 104-2 and third user computer 104-3 described with reference to FIG. 1. In some examples, the compromised server 302 may correspond to first server 116 described with reference to FIG. 1. In some examples, the CnC server 306 may correspond to one or more of the second server 118, third server 120 and fourth server 122 described with reference to FIG. 1.

In general, a hacker compromises an external website running on a server the victim user computer 304 visits regularly, and injects malicious content 308 (sometimes referred to as malicious code 308) into the website. For example, the malicious content 308 may be present on the compromised server 302. When a user from the victim user computer 304 visits the website on the compromised server 302, the malicious code 308 may be executed. In some examples, the malicious code 308 may be an executable JavaScript. This phase may sometimes referred to as an exploit phase. In some examples, the malicious code 308 may load a malware 310 on to the victim user computer 304.

The malware 310 loaded on to the victim user computer 304 may be an executable code. This phase may sometimes be referred to as a compromise phase. The malware executable code may then connect to the CnC server 306 and waits for commands from the CnC server 306 to be executed on the victim user computer 304. This phase may sometimes referred to as command and control phase.

Having described various phases of likely malicious attack and general operation of the security appliance 102, an example evaluation of various security entities in a computing environment will now be described. The security entities in one example, may be computing devices in the computing environment, for example, first user computer 104-1, second user computer 104-2, third user computer 104-3, first server 116, second server 118, third server 120, and fourth server 122. In some examples, the security entity may be the first user, second user and the third user. In some examples, it may be accounts used by the first user, second user and the third user. In some examples, the security entity may be an application executed on a computing device. For example, a mail application, a web browser application and the like. In some examples, the security entity may be a group of users belonging to a specific group or an organization.

Now, referring to FIG. 4, table 400 shows a plurality of decisive identifiers and corresponding security entities the decisive identifiers identify. Referring to table 400, column 402 shows decisive identifiers and column 404 shows security entities. As an example, referring to row 406, a Kerberos ID field in a network packet may identify a specific user as a security entity that corresponds to that network packet. As another example, referring to row 408, ApplePushGUID field in a network packet may identify a specific device as a security entity that corresponds to that network packet. As yet another example, referring to row 410, Cookies in a network packet may identify a specific device as a security entity in addition to a specific browser as another security entity that corresponds to that network packet. In general, a decisive identifier particularly identifies a specific security entity, based on evaluation of a network packet and selectively extracting a portion of the network packet.

Now, referring to FIG. 4A, table 430 shows various decisive identifiers, corresponding protocol of the network packet and one or more fields of the network packet required to identify the corresponding decisive identifier. For example, column 432 shows decisive identifiers, column 434 shows protocol name and column 436 shows one or more required field in the network packet corresponding to the protocol. As an example, referring to row 438, a decisive identifier "userid" may be extracted from a network packet conforming to Hyper Text Transfer Protocol ("http") protocol, based on the field "uri" ("Unform Resource Indicator") in the network packet. As an example, referring to row 440, a decisive identifier "ApplePushGUID" may be extracted from a network packet conforming to Secure Socket Layer (SSL) protocol, based on the field "client subject" in the network packet. As previously described with reference to FIG. 4 and table 400, each of the decisive identifiers identify a corresponding security entity.

As one skilled in the art appreciates, it may be beneficial to associate one or more decisive identifiers to a corresponding network address of a network device. Now, referring to FIG. 5, table 500, an example table is shown with a decisive identifier associated with a network address, for example, source identifier, sometimes referred to as source ID. As one skilled in the art appreciates, entries for table 500 may be created based on extracting selective information from one or more network packets, as previously disclosed. Referring to table 500, column 502 shows a time stamp, column 504 shows source ID, column 506 shows client details and column 508 shows status of the communication.

Now, referring to row 510, at time 1428494181, source ID was 1.1.1.1, a device ID of ABC-111111 (with a source ID of 1.1.1.1) communicated with domain GEO.DOMAIN.COM and the communication was successful. Now, referring to row 512, at time 1428494240, source ID was 1.1.1.1, a user ID of john.doe communicated with domain GEO.DOMAIN.COM and the communication was successful. Now, referring to row 514, at time 1428494332, source ID was 1.1.1.1, a device ID of ABC-111111 (with a source ID of 1.1.1.1) communicated with domain GEO.DOMAIN.COM and the communication was successful. Now, referring to row 516, at time 1428497128, source ID was 1.1.1.1, a device ID of ABC-22222 (with a source ID of 1.1.1.1) communicated with domain GEO.DOMAIN.COM and the communication was successful. Now, referring to row 518, at time 1428497128, source ID was 1.1.1.1, a user ID of jane.smith communicated with domain GEO.DOMAIN.COM and the communication was successful.

In summary, we notice that a source ID of 1.1.1.1 was assigned to device ID of ABC-11111 during one time period and source ID of 1.1.1.1. was assigned to a device ID of ABC-22222 in a different time period. Also, we notice that user john.doe was using the device with a source ID of 1.1.1.1 in one time period and another user jane.doe was using the device with a source ID of 1.1.1.1 in a different time period. In one example, device ID of ABC-11111 may correspond to first user computer 104-1 and device ID of ABC-22222 may correspond to second user computer 104-2, as shown in FIG. 1. Further, john.doe may correspond to a first user and jane.doe may correspond to a second user.

In some examples, it may be beneficial to extend association of a source ID to a security entity for more than one time period. Now, referring to FIGS. 6A and 6B, table 600, an example extension of association of a source ID to a security entity for more than one time period is disclosed. Referring to FIGS. 6A and 6B, table 600 is shown with various time stamp and corresponding decisive identifiers. Table 600 shows time stamp in column 602, source ID in column 604, decisive identifier in column 606 and comments in column 608. Referring to row 610, at time stamp of 142849481.223, the source ID was 1.1.1.1, decisive identifier was a Kerberos id of A. Now, in this example, the time stamp is shown in milliseconds and the time period is extended to one second. In other words, looking at the comment cell 612 of row 610, we notice that we associate the decisive identifier Kerberos:A to source ID 1.1.1.1 during the time interval 1428494181-1428494182. Now, referring to row 614, we notice that Personal Email id of M is associated with source ID of 1.1.1.1 during the time interval 14284262-14284263.

Now, referring to row 616, during time stamp of 14284261.781, decisive identifier Kerberos:A is again associated with source ID of 1.1.1.1. Now, referring to cell 618, we notice that we associate the decisive identifier Kerberos:A to source ID 1.1.1.1 during the time interval 1428494262-142849263. In addition, as there are no other kerberos identifiers other than A, we extend the association of kerberos:A to source ID 1.1.1.1 from the last time period when kerberos:A was identified to the current time period. In other words, the association is extended from time stamp 1428494182 to 1428494262.

Now, referring to row 620 and cell 622, we notice that decisive identifier personal email:M is associated with source ID of 1.1.1.1. Further, the association of personal email:M to source ID 1.1.1.1 is extended from the last period when personal email:M was identified to the current period, as no other personal email is associated with source ID 1.1.1.1 during this period.

Now, referring to row 626, we notice that there has been no activity between the time stamps 1428494798.223 to 1428496871.900 for source ID 1.1.1.1. Now, referring to row 628, we notice that decisive identifier Kerberos:A is associated with source ID 1.1.1.1. Referring to cell 630, we notice that the association of decisive identifier Kerberos:A is extended till the time period during which there was no activity. In other words, the association is extended from time stamp 1428494263 to 1428494799 (which in this example, refers to a sip session for source ID 1.1.1.1).

Now, referring to row 632, we notice that a new decisive identifier Kerberos:B was associated with source ID 1.1.1.1. Referring to cell 634, we notice that decisive identifier Kerberos:B is associated with source ID 1.1.1.1 for the time period 1428496871 to 1428496872. Referring to row 636, we notice that there was no activity between the time stamps 1428496972.223 to 1428497128.571 for source ID 1.1.1.1. Now, referring back to cell 634, we notice that the association of decisive identifier Kerberos:A is extended till the time period during which there was no activity for source ID 1.1.1.1. In other words, the association is extended from time stamp 1428496872 to 1428496973 (which in this example, refers to another sip session for source ID 1.1.1.1).

Now, referring to FIG. 6C, a pictorial graph 640 shows the association of decisive identifiers to a source ID of 1.1.1.1 over a period, as previously described with reference to FIGS. 6A and 6B. Line 642 shows various time stamps T1-T9 over a period of time. During time period T1-T5, decisive identifier Kerberos:A was associated with source ID 1.1.1.1. During time period T2-T4, decisive identifier Personal Email: M was associated with source ID 1.1.1.1. During time period T5-T6 and T7-T8 there was no decisive identifier associated with source ID 1.1.1.1. During time period T6-T7, decisive identifier kerberos:A was associated with source ID 1.1.1.1. During time period T8-T9, decisive identifier kerberos:B was associated with source ID 1.1.1.1.

Figure 6C:
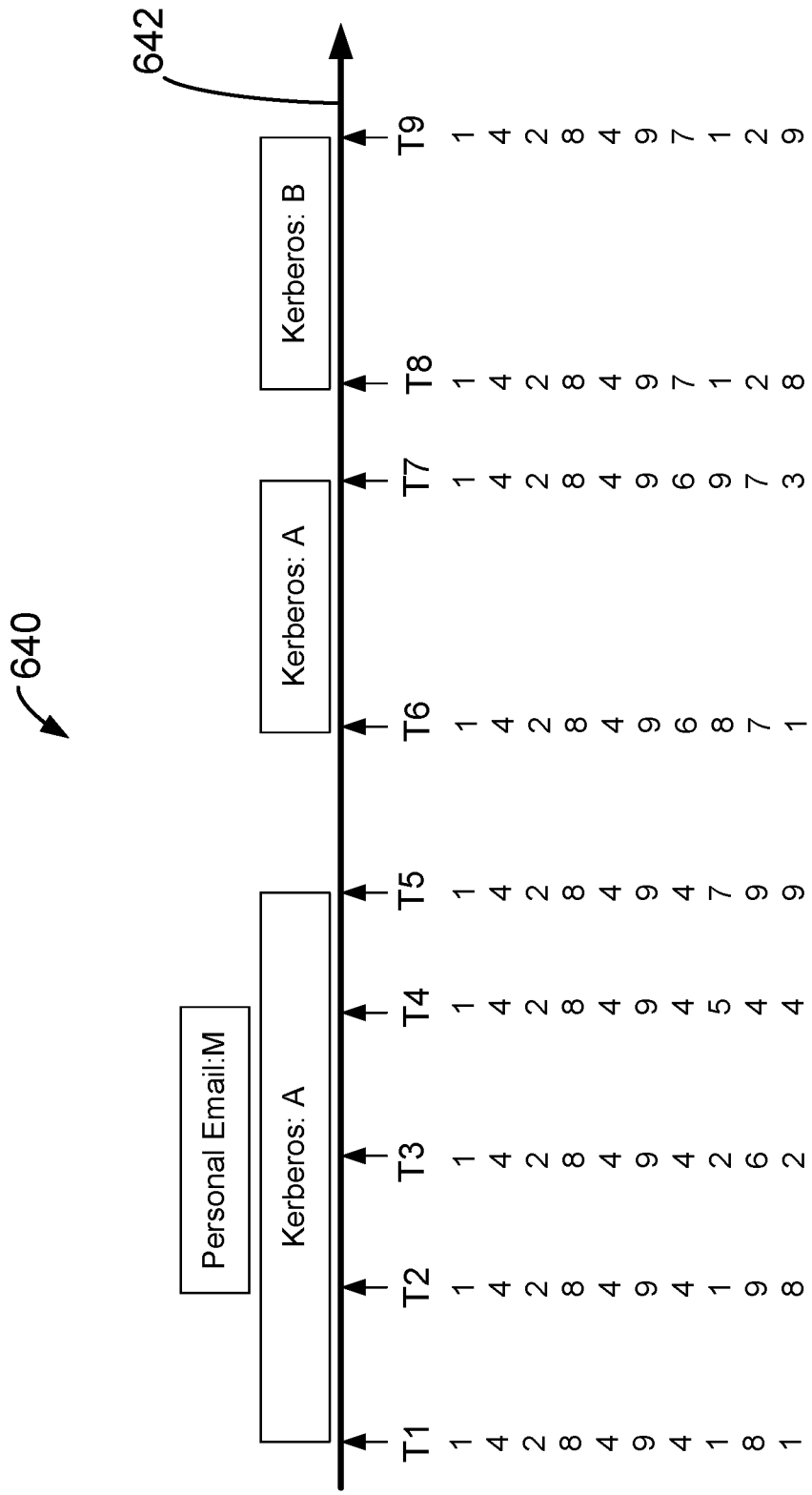
FIG. 6C shows a graph with various time stamps and corresponding decisive identifiers.

Now, based on FIGS. 6A, 6B and 6C, an example knowledge graph is constructed. Example knowledge graph is described with reference to FIGS. 7A and 7B. FIG. 7A shows table 700 showing various associations between a plurality of security entities, at various time stamps. FIG. 7B shows an updated knowledge graph table 730 showing various associations between a plurality of security entities, with extended time periods. Now, referring to table 700, column 702 shows time stamp, column 704 shows source ID, column 706 shows a first security entity, column 708 shows a second security entity, column 710 shows a first decisive identifier associated with at least one of the security entities and column 712 shows a second decisive identifier associated with at least one of the security entities. Various time stamps shown in table 700 correspond to the time stamp shown in FIG. 6C, which is a pictorial graph of information contained in FIGS. 6A and 6B. Further, association of one or more decisive identifiers as shown in table 500 of FIG. 5, further helps in developing the knowledge graph.

As an example, referring to row 714, at time stamp T1, source ID 1.1.1.1 is associated with first security entity first user computer and a second security entity first user, with a first decisive identifier Kerberos:A. For example, this corresponds to information stored in table 500 of FIG. 5. As another example, referring to row 716, at time stamp T2, source ID 1.1.1.1 is associated with first security entity first user computer and a second security entity first user, with a second decisive identifier personal email:M. Now, referring to row 718, at time stamp T5, there is no activity associated with source ID 1.1.1.1. Now, referring to row 720, at time stamp T8, source ID of 1.1.1.1 is associated with second user computer and second user (as shown in rows 516 and 518 of table 500 of FIG. 5 and further source ID of 1.1.1.1 is associated with decisive identifier kerberos:B, as described with reference to FIGS. 6A, 6B and 6C.

As previously described with reference to FIGS. 6A, 6B and 6C, the association between a security entity and a decisive identifier is extended to additional time periods, based on observed activity over the network. This extension of time period is shown and described in an updated knowledge graph table 730 shown in FIG. 7B. In one example, table 730 is similar to table 700 in construction. However, in time stamp column 702, a range of time period is shown, based on extension of time period, based on observed activity over the network. For example, based on activity observed (i.e. first decisive identifier of kerberos:A) at time stamp T1, T3 and T6, with an idle or no activity at time stamp T5, referring to row 732, the association between source ID of 1.1.1.1, first security entity and second security entity to decisive identifier kerberos:A is extended from T1-T5. Similarly, based on the observed activity at time stamp T2 and T4 (i.e. second decisive identifier of personal email:M), the association between source ID of 1.1.1.1, first security entity and second security entity to decisive identifier personal email:M is extended from T2-T4. As one skilled in the art appreciates, over time, the knowledge graph is enhanced with extended time periods showing association between a plurality of security entities and corresponding one or more decisive identifiers.

As one skilled in the art appreciates, security entities may be data, network, organization, device, persona (or user attributes) and application. In one example, the security entities are entities that may have attributes that may be directly or indirectly relevant from a security or threat analysis perspective. The security appliance 102 selectively extracts information from communication between two computing devices and builds one or more tables and matrices of useful information, for example, various tables and matrix described in this disclosure.

Figure 8:
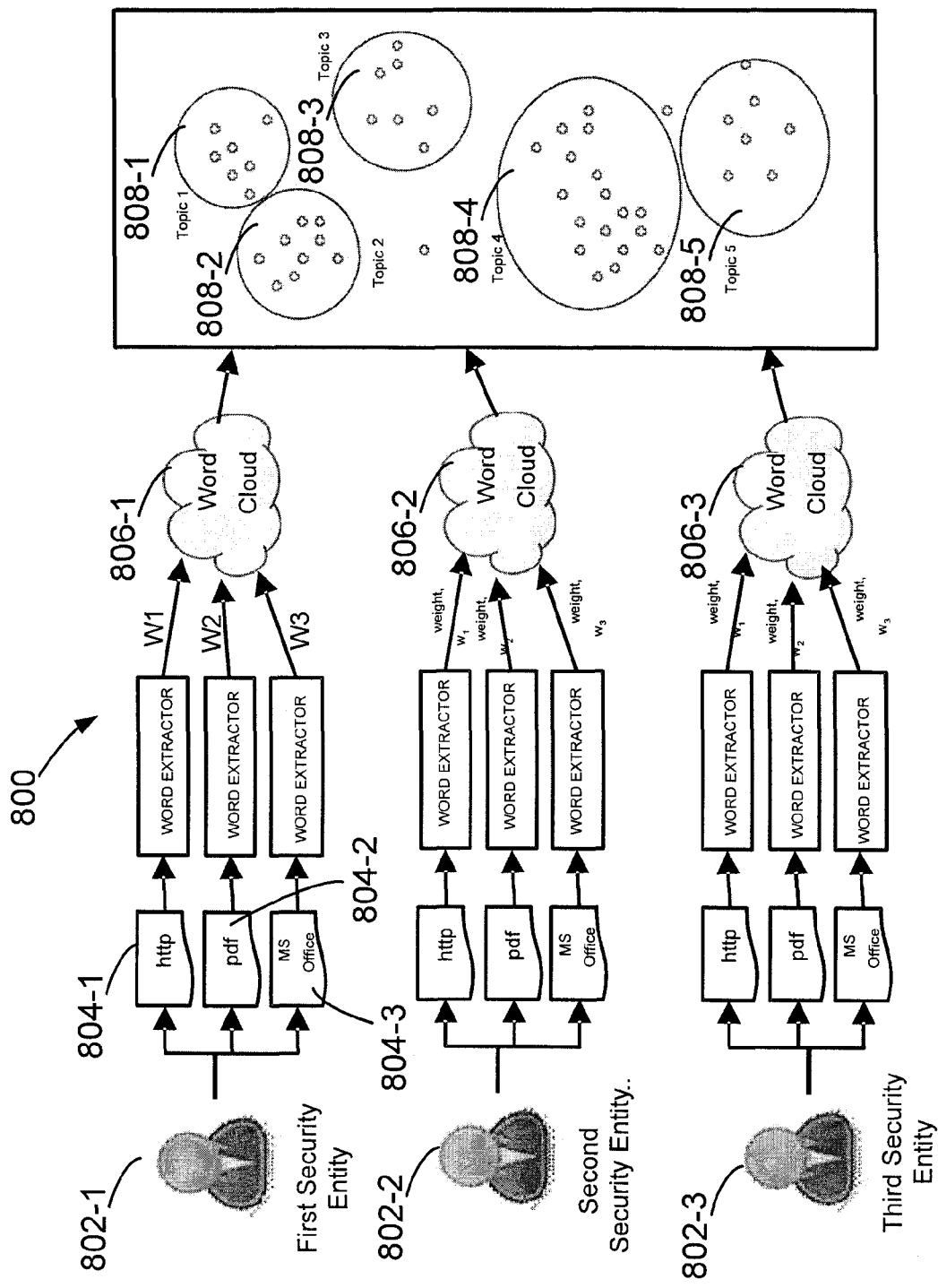
FIG. 8 shows an example work flow diagram, according to an example implementation of this disclosure.

Now, referring to FIG. 8, an example content extraction workflow diagram 800 is described. The workflow diagram 800 shows a plurality of security entities, for example, security entities 802-1, 802-2 and 802-3. In one example, security entities 802-1 to 802-3 may correspond to various computing devices, for example, first security entity 802-1 may correspond to first user computer 104-1, second security entity 802-2 may correspond to second user computer 104-2 and third security entity 802-3 may correspond to third user computer 104-3. t In some examples, security entities 802-1 to 802-3 may correspond to various users, for example, first user, second user and the third user.

Workflow diagram 800 also shows various document types 804-1 to 804-3 exchanged by the security entities, for example, with one or more destination computing devices (not shown). Each of the document types 804-1 to 804-3 conform to one or more predefined formats. As an example, a first document type 804-1 may correspond to a document conforming to HTTP (Hyper Text Transfer Protocol) format. As another example, a second document type 804-2 may correspond to a document conforming to a PDF format. And as yet another example, a third document type 804-3 may correspond to a word processing format, for example, a MICROSOFT® Office Word (sometimes referred to as MS Office) format.

The security appliance 102 processes various documents exchanged between a security entity and a destination computing device and extracts one or more words from the document. In one example, extracted words are weighted based on the document type, for example, weight of W1, W2 and W3. For example, first document type 804-1 may have a weight of W1, second document type 804-2 may have a weight of W2 and third document type 804-3 may have a weight of W3.

Based on the extracted words that are weighted, a plurality of word clouds are created. As an example, first word cloud 806-1 corresponds to words in documents exchanged by first security entity 802-1, second word cloud 806-2 corresponds to words documents exchanged by second security entity 802-2 and third word cloud 806-3 corresponds to words in documents exchanged by third security entity 802-3.

Figure 8A:
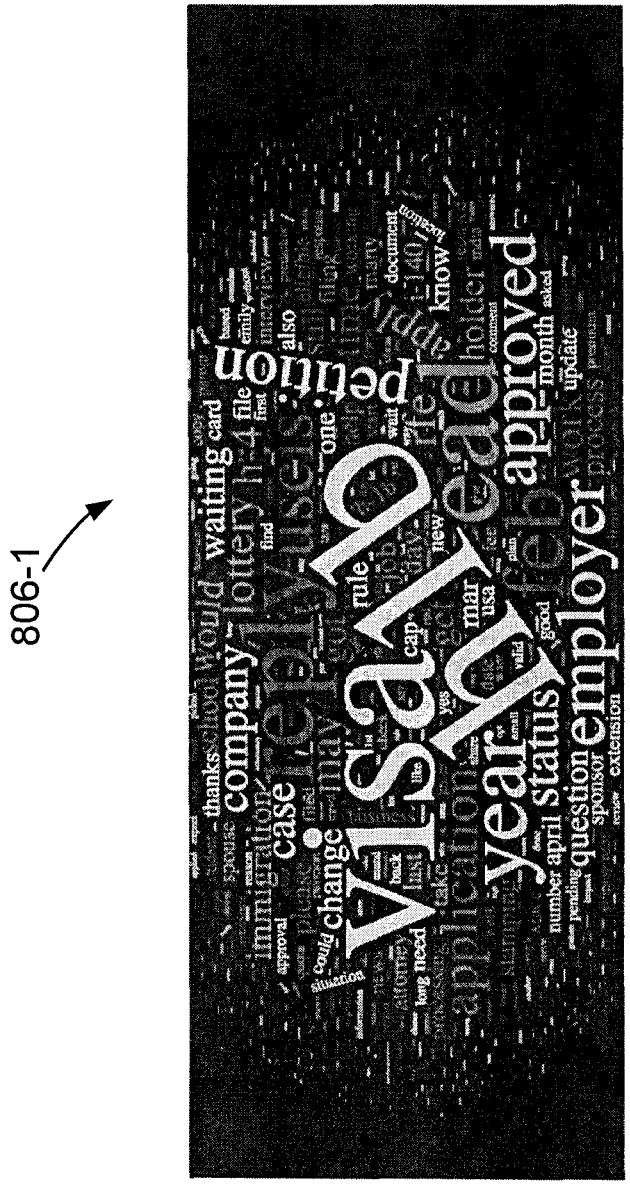
FIG. 8A shows an example word cloud, according to an example implementation of this disclosure.

FIG. 8A shows an example first word cloud 806-1. Referring to FIG. 8A, we notice that the first word cloud 806-1 has a plurality of words displayed with varying font sizes. In one example, based on the number of occurrences of a word and weight of the document type a corresponding weighted word score is generated for each word. Based on the weighted word score for each word, a corresponding font size is assigned to the word.

In one example, the weighted word score for a word is generated by a summation of number of times the word appears in a document multiplied by the weight associated with the document type. As an example, let us assume, a word "XYZ" appears N1 times in a HTML document, N2 times in a PDF document and N3 times in a MS Office document. Further, if weight for HTML document type is W1, document type PDF is W2 and document type MS Office is W3, then the weighted word score for word XYZ will be $$\text{Weighted word score for } XYZ = W1 \times N1 + W2 \times N2 + W3 \times N3 \qquad \text{Equation 1}$$

Now, referring to FIG. 8B, an example table 820 is shown with an example word with a weighted word score and a corresponding font size. Column 822 shows a plurality of words, column 824 shows corresponding weighted word score and column 826 shows font size. In one example, the table 820 is constructed for all the words in the word cloud and ordered in a descending order, based on the weighted word score. And, based on the weighted word score, a corresponding font size is assigned to display the words in the word cloud. As one skilled in the art appreciates, a given font size may be used for a range of weighted word score.

Based on table 820 of FIG. 8B, we notice that the word "h1b" has a high weighted word score. Therefore, the word "h1b" prominently appear in the first word cloud 806-1, with the largest font size, in this example, a font size of 50 pt. Next, the word "visa" has next highest weighted word score. So, the word "visa" is displayed with a next larger font size, in this example, a font size of 40 pt. Next, word "ead" seems to have next highest weighted word score and is displayed with a smaller font size, in this example, a font size of 30 pt. As one skilled in the art appreciates, the security appliance 102 may be configured to selectively display word clouds that corresponds to each of the security entity on a display device (not shown).

As one skilled in the art appreciates, based on the first word cloud, the primary subject matter may involve immigration. Further, given the association between the first security entity and the first word cloud, it appears like first security entity may be an attorney, possibly specializing in immigration or may be an employee of a human resources department or even an employee interested in a visa matter.

Figure 8C:
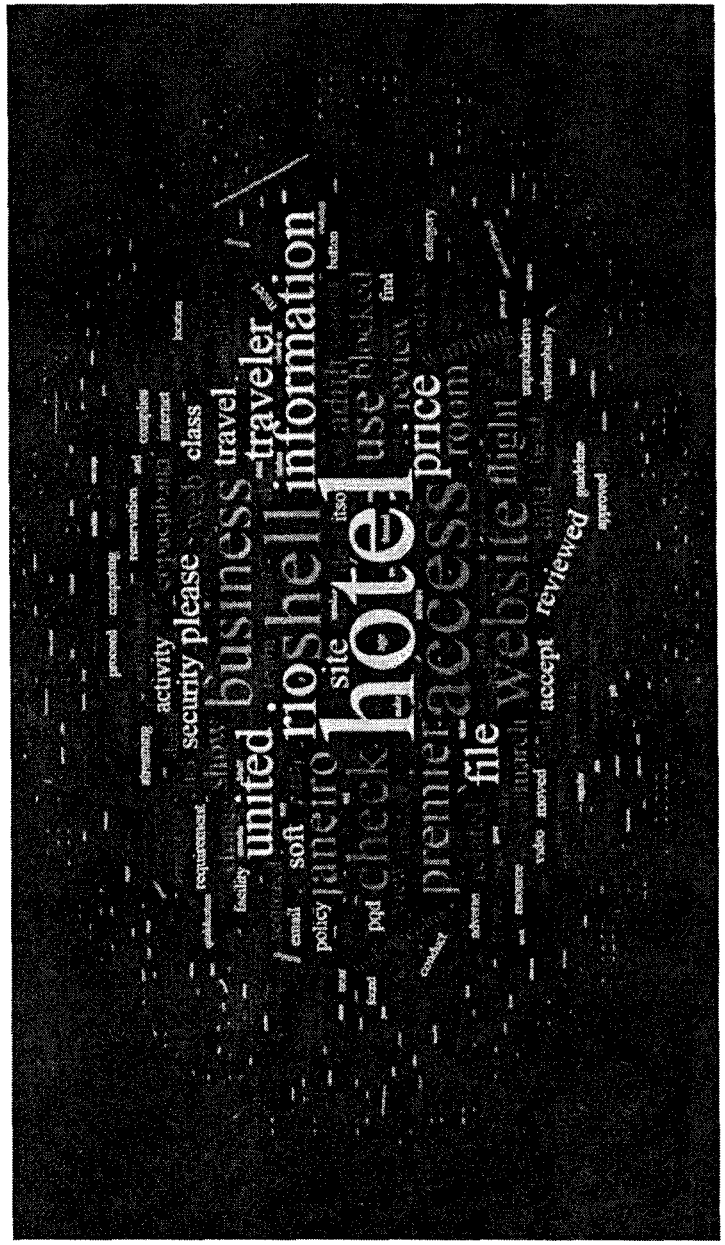
FIG. 8C shows another example word cloud, according to an example implementation of this disclosure.
Figure 8D:
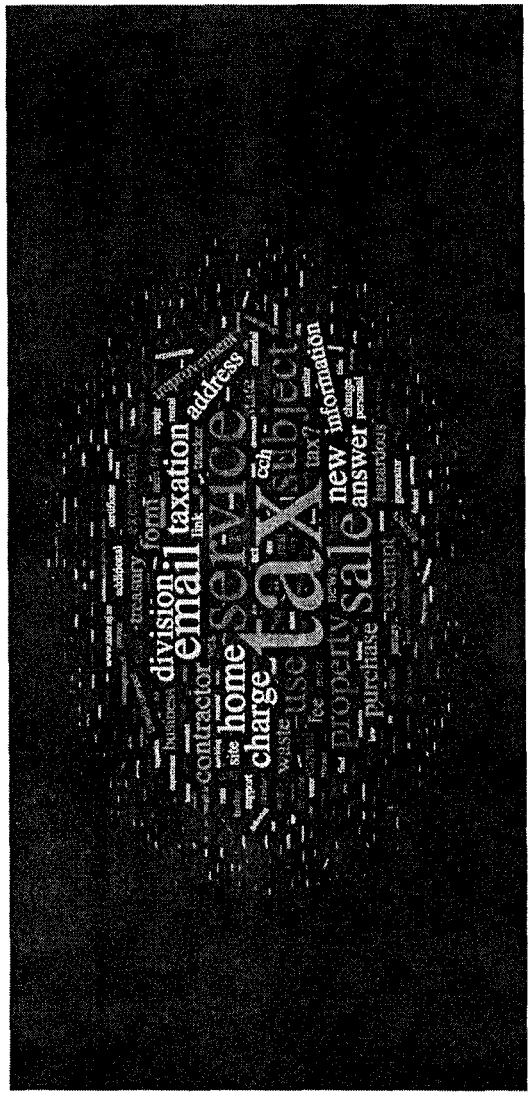
FIG. 8D shows yet another example word cloud, according to an example implementation of this disclosure.

FIG. 8C shows an example second word cloud 806-2 and FIG. 8D shows an example third word cloud 806-3. Referring to FIG. 8C, based on the second word cloud, the primary subject matter may involve travel. Further, given the association between the second security entity 802-2 and the second word cloud 806-2, second word cloud 806-2 may imply that second security entity 802-2 may be associated with a possible executive and related to some impending travel or resources related to travel.

Referring to FIG. 8D, based on the third word cloud 806-3, the primary subject matter may be related to tax matters. Further, given the association between the third security entity 802-3 and the third word cloud 806-3, third word cloud 806-3 may imply that the third security entity 802-3 may be associated with someone involved in tax matters.

Now, referring back to FIG. 8, workflow diagram 800, in one example, words from the plurality of word clouds are extracted and classified into a plurality of topic clusters, for example, topic clusters 808-1 to 809-5. In one example, these plurality of topic clusters are further processed, which will be described now with reference to FIG. 9.

Figure 9:
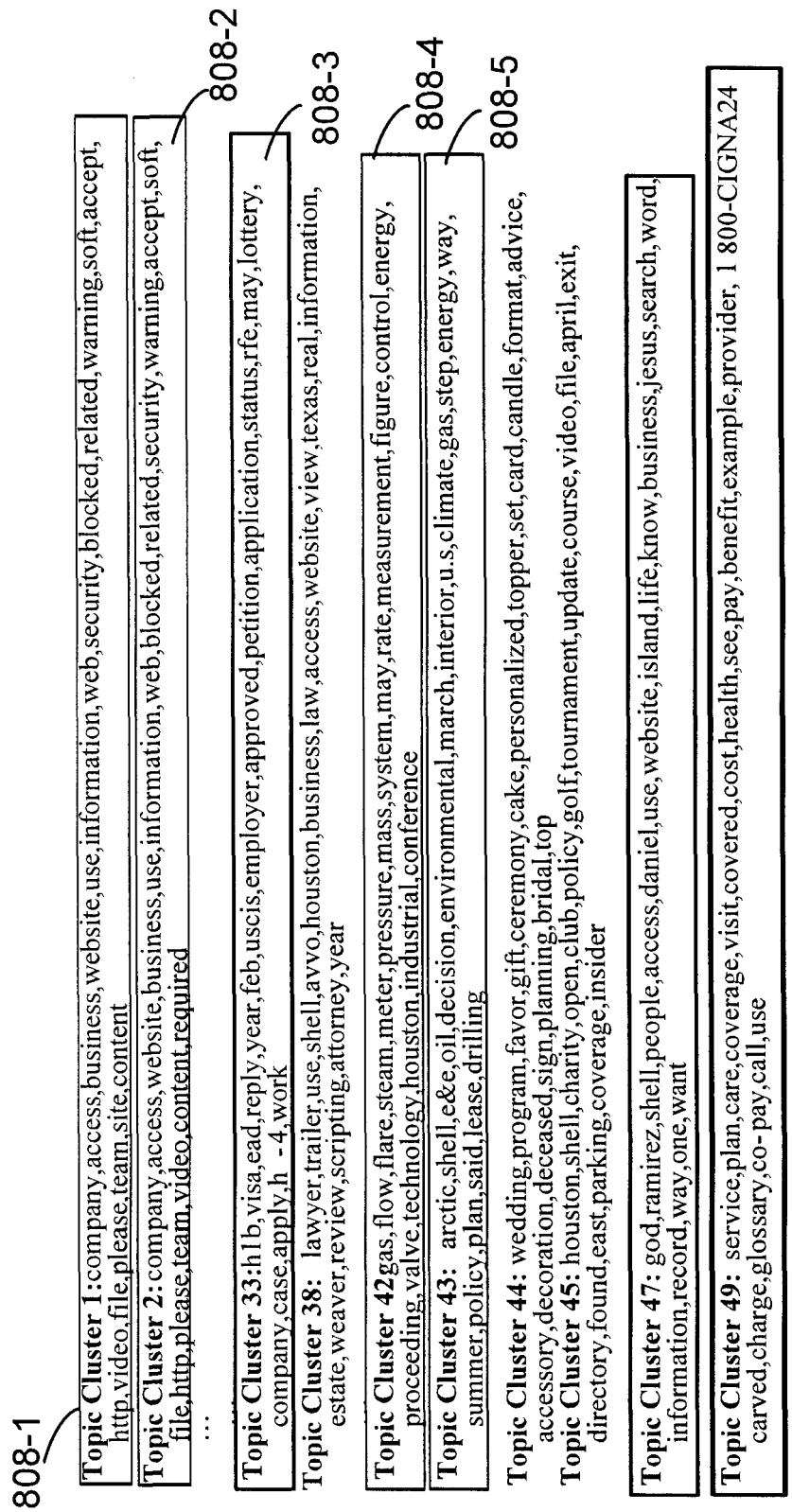
FIG. 9 is an example topic cluster, according to an example implementation of this disclosure.

FIG. 9 shows plurality of topic clusters 808-1 to 808-5. In this example, to begin with, each of the topic clusters have one group of words associated with them. To begin with, the topic clusters are formed by selectively combining words from a plurality of word clouds. As an example, if two word clouds have a subset of common words above a threshold value, then the two word clouds are combined together to form a topic cluster. In one example, the weighted word count of each of the words in a word cloud may be used to decide if words in two word clouds may belong to a similar topic. If so, then, the words in the two word clouds are combined to form the topic cloud.

In one example, one or more topic clusters are evaluated and merged to create an updated tropic cluster, based on the similarity of the words in each of the topic cluster. In one example, a topic cluster is selectively selected to be merged with another topic cluster, based on a commonality in words between the two topic clusters.

As an example, if A1 is the number of terms that define a first topic (in other words, number of words in a first topic cluster), A2 is the number of terms that define a second topic (in other words, number of words in a second topic cluster and C is the number of words that are common between first topic cluster and the second topic cluster, then a commonality distance D is measured by A1+A2−(2×C). Having calculated a commonality distance between two topic clusters, a first consolidation index value CI1 is calculated using the formula $$CI1 = (A1 * A2)/(D)^2 \qquad \text{Equation 2.}$$

If the first consolidation index value CI1 so calculated is above a threshold value, then the first topic cluster and the second topic cluster are merged together to create a consolidated topic cluster. In one example, the words in each of the topic clusters are normalized using natural language processing, for example, normalizing verbs, nouns etc. In one example, the first consolidation index value is indicative of a degree of commonality between the words in two different topic clouds.

As an example, referring to FIG. 9A, we notice that topic cluster 1 and topic cluster 2 are merged together to form a consolidated topic cluster 902-2. As another example, topic cluster 42 and topic cluster 43 are merged together to form another consolidated topic cluster 902-4. In one example, the topic clusters are evaluated for consolidation on a periodic basis. The number of topic clusters reduce, as a plurality of topic clusters may get consolidated into a single or a few consolidated topic clusters. And, a few topic clusters will remain independent, without merging with other topic clusters.

In one example, each of the security entity is associated with one or more topic clusters or consolidated topic clusters, based on the words in their associated word cloud and the words in the topic clusters or consolidated topic clusters. In one example, one or more topic clusters or consolidated topic clusters may be further merged together to form another consolidated topic cluster. As an example, if P number of security entities are associated with a first topic cluster (or a first consolidated topic cluster) and Q number of security entities are associated with a second topic cluster (or a second consolidated topic cluster) and the commonality distance between the first topic cluster and the second topic cluster is D (as previously described), then, a second consolidation index value CI2 is calculated using the formula $$CI2 = (P * Q)/(D)^2 \qquad \text{Equation 3.}$$

If the second consolidation index value CI2 so calculated is above a threshold value, then the first topic cluster and the second topic cluster are merged together to create a consolidated topic cluster. In one example, the second consolidation index value is indicative of a degree of commonality between two different topic clusters associated with a plurality of security entities.

In one example, a subset of topic clusters associated with a security entity is classified as a recurring topic clusters and another subset of topic clusters associated with the security entity is classified as a transient topic clusters. In one example, topic clusters are created periodically, for example, on a daily basis. If a topic cluster appears on a repeated basis in a given period, for example, in a month, then, that topic cluster is identified as a recurring topic cluster, for example, based on a frequency of occurrence of the topic cluster in a given period. As an example, a topic cluster that appears twenty times in a month may be identified as a recurring topic cluster. If on the other hand, a topic cluster appears randomly, then, that topic cluster is identified as a transient topic cluster. As an example, a topic cluster that appears a few times in a month may be identified as a transient topic cluster.

In one example, when a new topic cluster associated with a security entity is classified as a transient topic cluster, a security investigation is initiated for the security entity. For example, referring to FIG. 9B, table 920, column 922 shows security entity, column 924 shows recurring topic clusters and column 926 shows transient topic clusters. Now, referring to row 928, we notice that for security entity of first user, recurring topic clusters are topic cluster 1, topic cluster 2, topic cluster 33 and topic cluster 38. And, transient topic cluster is topic cluster 45. If over time, a new topic cluster, for example topic cluster 45 is added as a transient topic cluster for first user, a security investigation is initiated.

In one example, if a given topic cluster is associated with a plurality of security entities, for example, above a threshold value, then that topic cluster may be classified as a recurring topic cluster, based on the number of associations with corresponding security entities. In one example, a new topic cluster that is associated with a plurality of security entities may not trigger a security investigation. In some examples, if over about one hundred security entities are associated with a new topic cluster, then no security investigation may be initiated.

Figure 10:
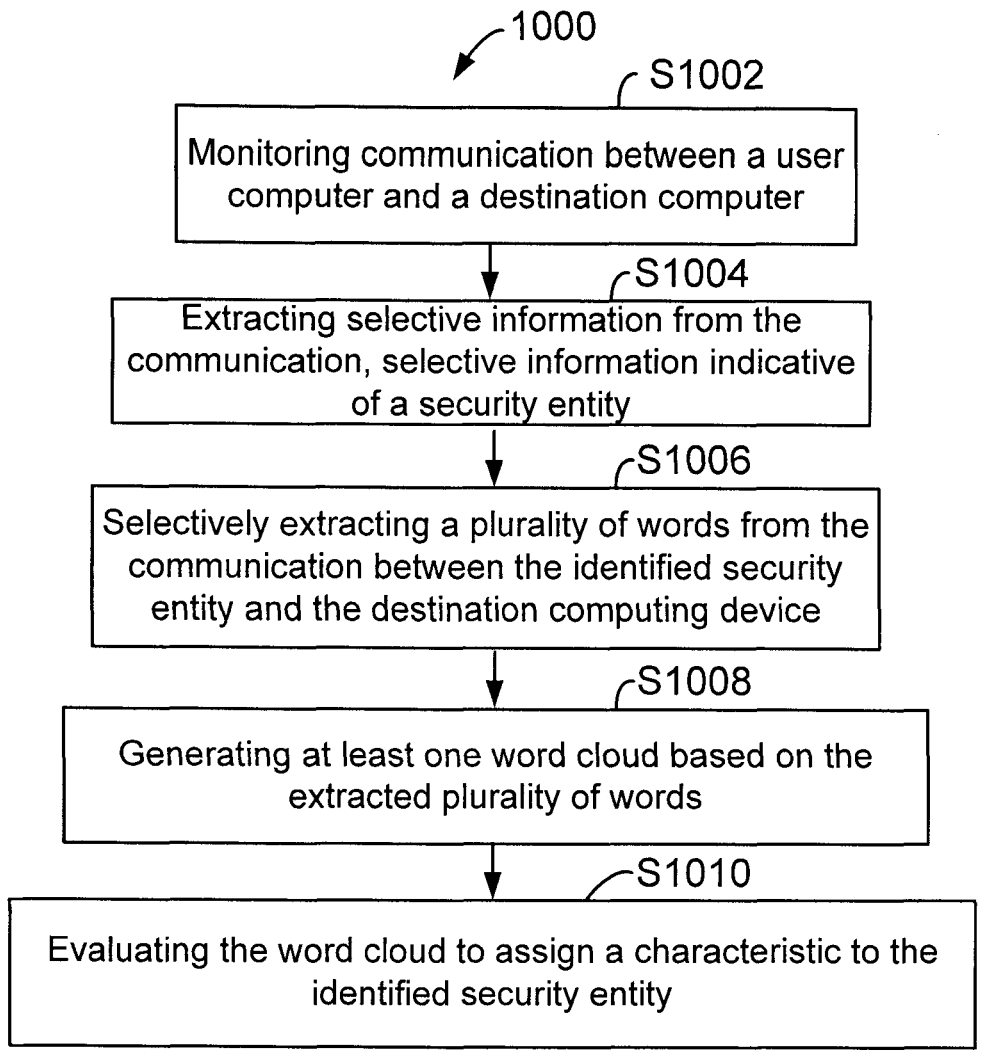
FIG. 10 is an example flow diagram to characterize a security entities in a computing environment, according to an example implementation of this disclosure.

Now, referring to FIG. 10 an example flow diagram 1000 is described. In block S1002, communication between a user computer and a destination computer is monitored. In one example, the security appliance 102 of FIG. 2 monitors the communication between a user computer and a destination computer, as previously described. In some examples, the user computer may be one or more of the user computers, for example, first user computer 104-1, second user computer 104-2 and third user computer 104-3 as shown and described with reference to FIG. 1. In some examples, the destination computing device may be one or more the servers, for example, first server 116, second server 118, third server 120 and the fourth server 112 as shown and described with reference to FIG. 1.

In block S1004, selective information from the communication is extracted. For example, as described with reference to security appliance 102 of FIG. 2 selective information from the packets are extracted. In one example, the selective information is indicative of a security entity. For example, as described with reference to FIG. 5 and FIGS. 6A and 6B, selective information is indicative of a security entity, for example, first user computer or a first user.

In block S1006, a plurality of words from the communication between the identified security entity and the destination computing device is extracted. For example, as described with reference to FIG. 8 and workflow diagram 800, a plurality of words are extracted from one or more documents exchanged between the security entity and a destination computing device. In one examples, one or more documents exchanged are stored in the object store 220 of the security appliance 102 and the analytics engine 212 may selectively retrieve the stored documents and selectively extract the words from one or more documents.

In block S1008, at least one word cloud is generated based on the extracted plurality of words. For example, a word cloud is generated as shown in FIG. 8A. In one example, the analytics engine 212 of the security appliance generates the word cloud.

In block S1010, the word cloud is evaluated to assign a characteristic to the identified security entity. For example, as described with reference to FIGS. 8A and 8B, significance of each of the identified word is characterized and based on the significance of the words, for example, as shown by their font size, a characteristic is assigned to the security entity. In one example, the characteristic is indicative of a subject matter that is significant in the word cloud. In some examples, more than one word may be utilized to characterize the identified security entity. For example, as described with reference to FIGS. 8A to 8D, the identified security entity may be characterized based on one or more words in the word cloud. In one example, the analytics engine 212 analyzes the word cloud and characterizes the security entity. In some examples, the security appliance 102 may use the application programming interface 228 to selectively display the word cloud on a display device (not shown).

Figure 10A:
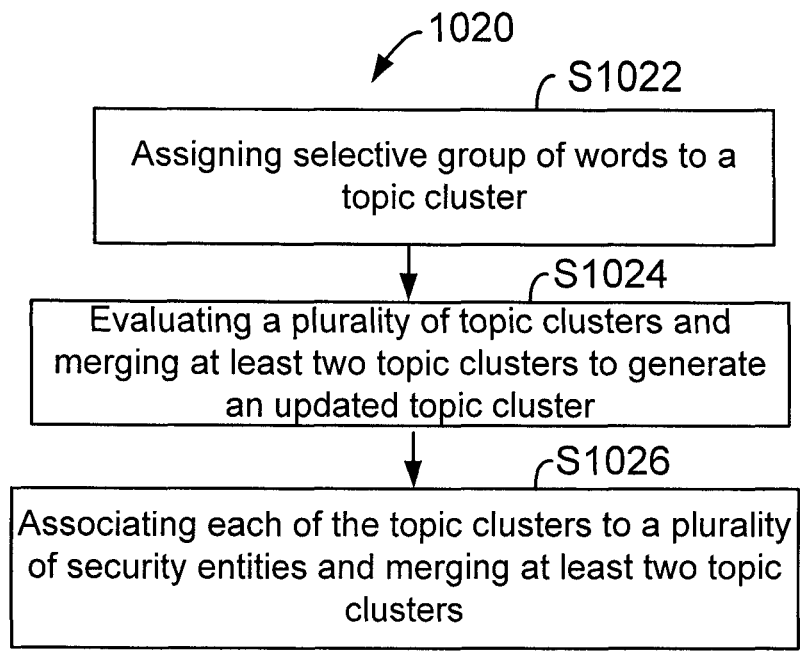
FIG. 10A is an example flow diagram to create a topic cluster, according to an example implementation of this disclosure.

Now, referring to FIG. 10A, another example flow diagram 1020 is disclosed. In block S1022, selective groups of words are assigned to a topic cluster. For example, as described with reference to FIG. 8 and workflow diagram 800, selective groups of words are assigned to a topic clusters. Example topic clusters are shown in FIG. 9. In one example, the analytics engine 212 of the security appliance 102 may generate the topic cluster.

In block S1024, a plurality of topic clusters are evaluated and based on the evaluation, at least two topic clusters are merged to generate an updated topic cluster. In some examples, the updated topic cluster may be alternatively referred to as consolidated topic clusters. In one example, the analytics engine 212 of the security appliance 102 may generate the updated topic cluster.

In block S1026, each of the topic cluster is associated with a plurality of security entities. In some examples, based on a second consolidated index, two topic clusters may be merged to create a consolidated topic cluster. In one example, the analytics engine 212 of the security appliance 102 may associate the topic cluster with a plurality of security entities. In some examples, the association may be stored in the knowledge graph 214 of the security appliance 102.

The embodiments disclosed herein can be implemented through at least one software program running on at least one hardware device and performing various functions of the security appliance. Various functions of the security appliance as described herein can be at least one of a hardware device, or a combination of hardware device and software module.

The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means, and at least one software means. The method embodiments described herein could be implemented in pure hardware or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for characterizing a security entities in a computing environment, comprising:
    monitoring a communication between a user computer and at least one destination computer by a security appliance;
    extracting selective information from the communication by the security appliance, selective information indicative of an identity of the security entity;
    selectively extracting a plurality of words from the communication between the identified security entity and at least one destination computer;
    generating at least one word cloud based on the extracted plurality of words;
    evaluating the word cloud to assign a characteristic to the identified security entity;
    assigning words from a plurality of word clouds to one or more topic clusters; and
    periodically evaluating a plurality of topic clusters and merging at least two topic clusters to generated an updated topic cluster based on a first consolidation index,
    wherein at least two topic clusters are merged based on a commonality between the words in the topic clusters, indicated by a first consolidation index value.

2. The method of claim 1, wherein each of the topic cluster is associated with a plurality of security entities and at least two topic clusters are merged based on a second consolidation index value.

3. The method of claim 1, further including presenting the words in the word cloud on a display device by the security appliance.

4. The method of claim 1, further including, presenting the plurality of topic clusters and associated words on a display device by the security appliance.

5. The method of claim 1, further including, periodically classifying a subset of the topic clusters associated with the security entity as a recurring topic clusters and another subset of the topic clusters as a transient topic clusters.

6. The method of claim 5, further including, triggering a security investigation for the security entity, when a new topic cluster associated with the security entity is classified as a transient topic cluster.

7. The method of claim 5, wherein the security appliance will not trigger the security investigation when the new topic cluster is newly associated with a plurality of additional security entities.

8. A system to characterize a security entity in a computing environment, comprising:
    a security appliance configured to
        monitor a communication between a user computer and a destination computer;
        extract selective information from the communication, selective information indicative of an identity of the security entity;
        selectively extract a plurality of words from the communication between the identified security entity and at least one destination computer;
        generate at least one word cloud based on the extracted plurality of words; and
    evaluate the word cloud to assign a characteristic to the identified security entity,
        wherein, words from a plurality of word clouds are assigned to one or more topic clusters;
        wherein, a plurality of topic clusters are periodically evaluated and at least two topic clusters are merged to generated an updated topic cluster based on a first consolidation index; and
        wherein at least two topic clusters are merged based on a commonality between the words in the topic clusters, indicated by the first consolidation index value.

9. The system of claim 8, wherein each of the topic cluster is associated with a plurality of security entities and at least two topic clusters are merged based on a second consolidation index value.

10. The system of claim 8, wherein the words in the word cloud are presented on a display device by the security appliance.

11. The system of claim 8, wherein, the plurality of topic clusters and associated words are displayed on a display device by the security appliance.

12. The system of claim 8, wherein, a subset of the topic clusters associated with the security entity are classified as a recurring topic clusters and another subset of the topic clusters are classified as a transient topic clusters.

13. The system of claim 12, wherein, a security investigation is triggered for the security entity, when a new topic cluster associated with the security entity is classified as a transient topic cluster.

14. The system of claim 12, wherein the security appliance will not trigger the security investigation when the new topic cluster is newly associated with a plurality of additional security entities.

* * * * *